(12) United States Patent
Muthukumar et al.

(10) Patent No.: US 8,843,775 B2
(45) Date of Patent: Sep. 23, 2014

(54) ENERGY OPTIMIZATION TECHNIQUES IN A COMPUTING SYSTEM

(75) Inventors: Kalyan Muthukumar, Bangalore (IN); Seshadri Harinarayanan, Bangalore (IN); Rama Kishan V. Malladi, Bangalore (IN); Raghavendra S. Hebbalalu, Bangalore (IN); Mukesh Gangadhar, Bangalore (IN)

(73) Assignee: Intel Corporation, Santa Clara, CA (US)

( * ) Notice: Subject to any disclaimer, the term of this patent is extended or adjusted under 35 U.S.C. 154(b) by 249 days.

(21) Appl. No.: 13/018,810

(22) Filed: Feb. 1, 2011

(65) Prior Publication Data

US 2012/0089852 A1    Apr. 12, 2012

(51) Int. Cl.
*G06F 1/26* (2006.01)
*G06F 1/00* (2006.01)
*G06F 9/00* (2006.01)

(52) U.S. Cl.
USPC ............................... 713/320; 713/1; 713/322

(58) Field of Classification Search
USPC ............................................. 713/1, 320, 322
See application file for complete search history.

(56) References Cited

U.S. PATENT DOCUMENTS

| | | | | |
|---|---|---|---|---|
| 7,523,373 | B2 * | 4/2009 | Russell et al. | 714/745 |
| 7,732,949 | B2 * | 6/2010 | Goodnow et al. | 307/151 |
| 8,171,323 | B2 * | 5/2012 | Rakshani et al. | 713/323 |
| 2002/0158923 | A1 * | 10/2002 | Panagrossi et al. | 345/864 |
| 2003/0007006 | A1 * | 1/2003 | Baar et al. | 345/767 |
| 2007/0239398 | A1 * | 10/2007 | Song et al. | 702/186 |
| 2008/0229222 | A1 * | 9/2008 | Kake | 715/764 |
| 2008/0250260 | A1 * | 10/2008 | Tomita | 713/324 |
| 2009/0158061 | A1 * | 6/2009 | Schmitz et al. | 713/300 |
| 2009/0172375 | A1 * | 7/2009 | Rotem et al. | 713/1 |
| 2009/0288028 | A1 * | 11/2009 | Gohda et al. | 715/769 |
| 2010/0191997 | A1 * | 7/2010 | Dodeja et al. | 713/323 |
| 2010/0292854 | A1 * | 11/2010 | Burg et al. | 700/291 |
| 2011/0145555 | A1 * | 6/2011 | Nayar et al. | 713/1 |
| 2011/0252248 | A1 * | 10/2011 | Cameron et al. | 713/300 |
| 2012/0016606 | A1 * | 1/2012 | Petit et al. | 702/61 |
| 2012/0198263 | A1 * | 8/2012 | Berke et al. | 713/340 |

* cited by examiner

*Primary Examiner* — Paul R Myers
*Assistant Examiner* — Christopher a Daley
(74) *Attorney, Agent, or Firm* — Blakely, Sokoloff, Taylor & Zafman LLP

(57) ABSTRACT

A computing platform may include components to determine performance loss values and energy savings values for each of the plurality of regions and/or the memory boundedness value of each of a plurality of regions within an application. The computing platform may provide a user interface for a user to provide a user input, which provides an indication of an acceptable performance loss. For the provided performance loss value, the frequency values may be determined and the processing element may be operated at the frequency values while processing each of the plurality of regions.

26 Claims, 9 Drawing Sheets

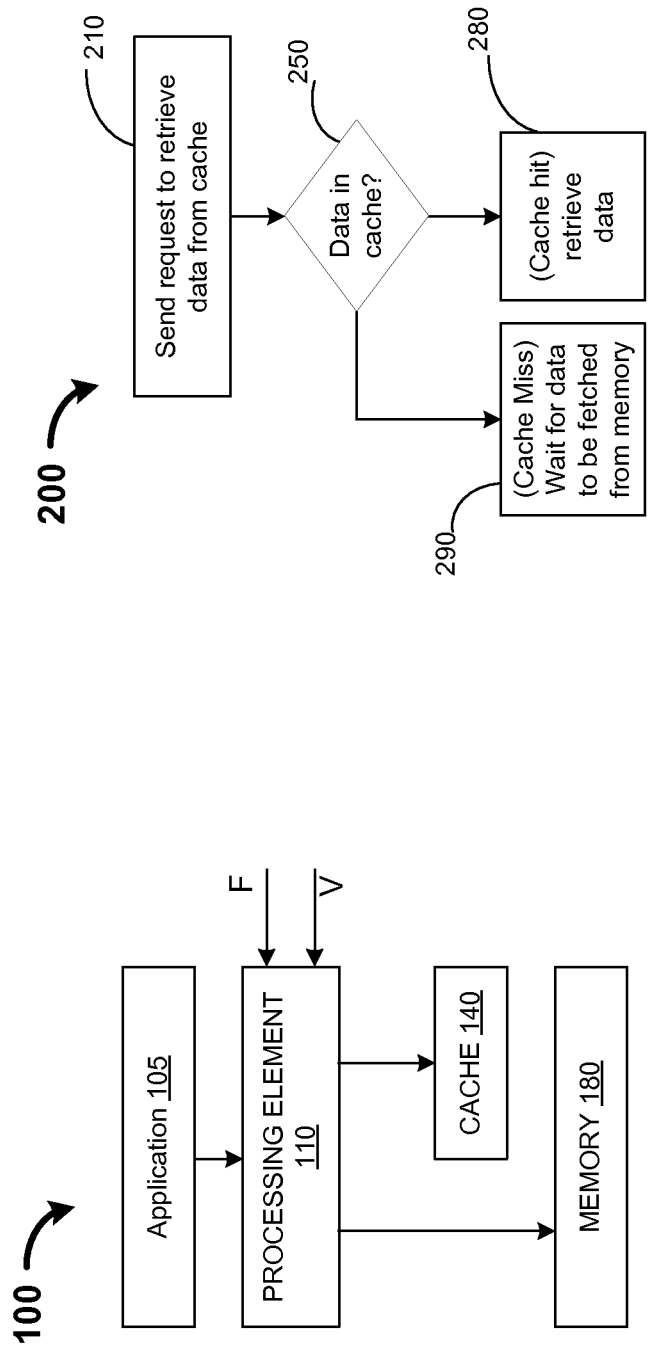

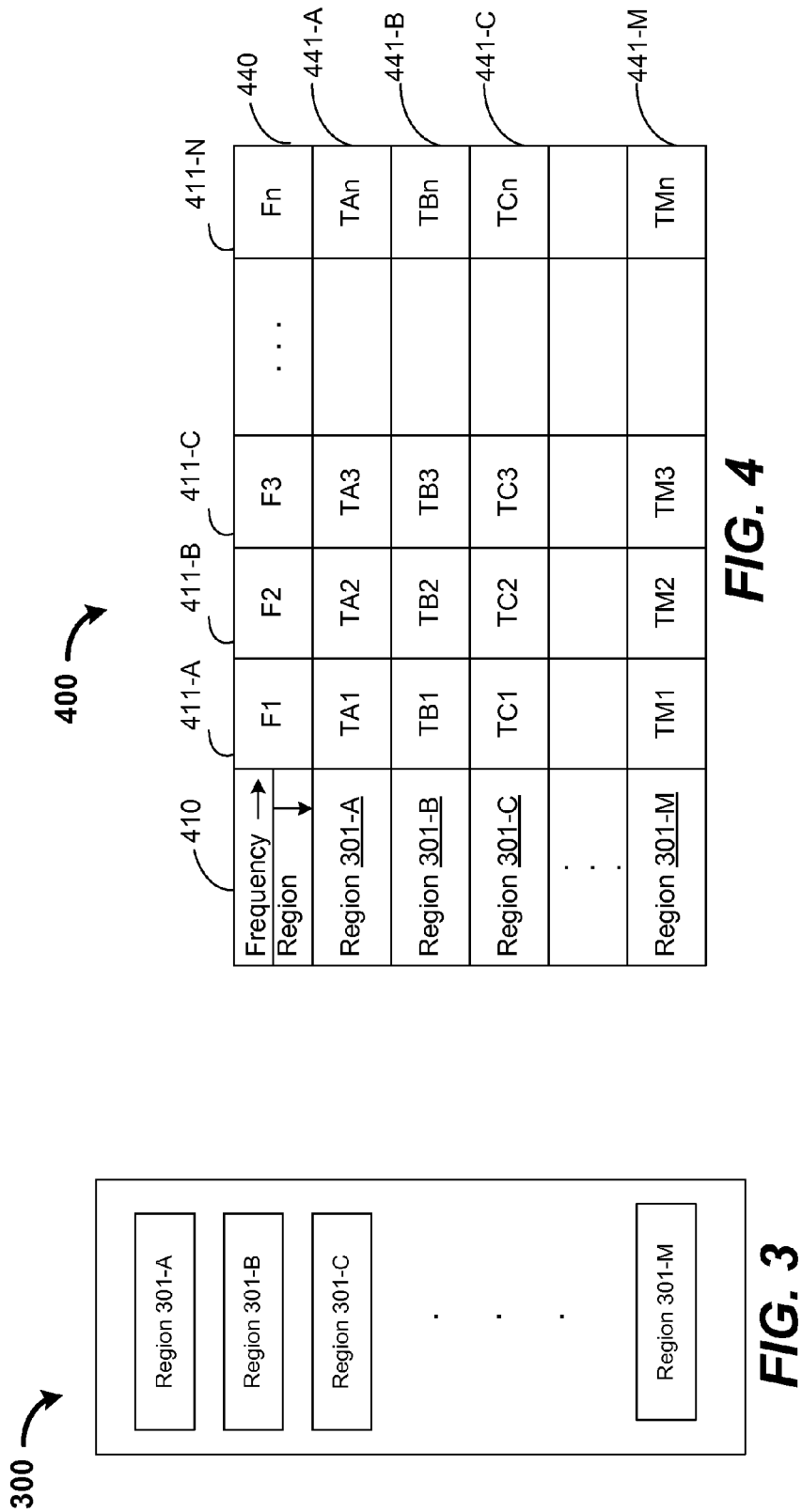

| Region 301-A | Region 301-B | Region 301-C | Region 301-D | Energy Saving (%) | Performance Loss (%) |
|---|---|---|---|---|---|
| F1 (1600) | F1 (1600) | F1 (1600) | F1 (1600) | 0% | 0% |
| F2 (1333) | F1 (1600) | F1 (1600) | F2 (1333) | 5.8% | 1.9% |
| F1 (1600) | F1 (1600) | F1 (1600) | F2 (1333) | 0.8% | 2.6% |
| F1 (1600) | F2 (1333) | F2 (1333) | F1 (1600) | 0.8% | 2.9% |
| F3 (1066) | F1 (1600) | F1 (1600) | F3 (1066) | 21.3% | 10.6% |
| F3 (1066) | F1 (1600) | F1 (1600) | F1 (1600) | 16.1% | 5.8% |
| F2 (1333) | F2 (1333) | F2 (1333) | F2 (1333) | 8% | 10.5% |

FIG. 6

ENERGY OPTIMIZATION TECHNIQUES IN A COMPUTING SYSTEM

CROSS-REFERENCE TO RELATED APPLICATIONS

This application claims priority to Indian Patent Application No. 2408/DEL/2010, filed Oct. 8, 2010, the entire contents of which are hereby incorporated by reference herein.

BACKGROUND

A computing system may include one or more processors, operating system(s), and a plurality of applications and the computing system may consume energy while performing the applications. One of the techniques adopted for energy optimization may include dynamic voltage and frequency scaling (DVFS) in which the voltage and frequency of the processors or parts such as cores thereof may be varied based on occurrence of some condition. In one prior approach, a dynamic optimizer may reduce the frequency of the processor while the application may suffer from Last Level Cache (LLC) misses. As depicted in FIG. 1, the processing element 110, while processing an application 105 may send a request to retrieve data from a cache 140 as depicted in block 210 of FIG. 2. If the data is present in the cache 140 (cache hit), as determined in block 250, the processing element 110 may fetch data from the cache 140 as depicted in block 280. If the data is not present in the cache 140 (cache miss), the processing element 110 may wait for data to be fetched from the memory 180 as depicted in block 290.

The application 105 may comprise several regions and some regions (first regions) may be processor-bound and some others (second regions) may be memory-bound. The processing element 110 may spend most of the time in processing the first regions of the application 105 if the data is already present in the cache 140. On the other hand, if the data is not present in the cache 140, the processing element 110 may spend most of the time waiting for data to be fetched from the memory into the cache 140 to process the second regions. In such a scenario, the second regions may be termed as more memory-bound as compared to the first regions.

As the processing element 110 may wait for data to be fetched from memory 180, it may be advantageous to decrease the frequency (F) provided to the processing element 110. As a result of operating the processing element 110 at a lower frequency, the performance loss may be minimal, but the energy savings by operating the processing element 110 at a lower frequency may be substantial. Based on how memory-bound (i.e. how much it suffers from LLC misses) a region of the application is, the frequency may be scaled down by a factor X. Such a prior technique may automatically decide what it considers to be a best trade-off between performance loss and energy savings by choosing a frequency and/or voltage value of X and Y for that program region. However, the frequency value (X) and/or voltage value (Y) so selected may not be the best trade-off from the user's perspective.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

FIG. 1 illustrates a computing platform 100.

FIG. 2 is a flow-chart, which illustrates cache misses incurred by an application performed by the computing platform 100.

FIG. 3 illustrates an application 300, which may include a plurality of regions in accordance with one embodiment.

FIG. 4 illustrates a table 400, which depicts the time taken for each region to be processed at different frequency values in accordance with one embodiment.

FIG. 6 illustrates a table 600, which depicts a technique to save energy for a known performance loss incurred while operating the processing element at four different frequencies to perform four different regions within an application in accordance one with embodiment.

DETAILED DESCRIPTION

Figure 5:
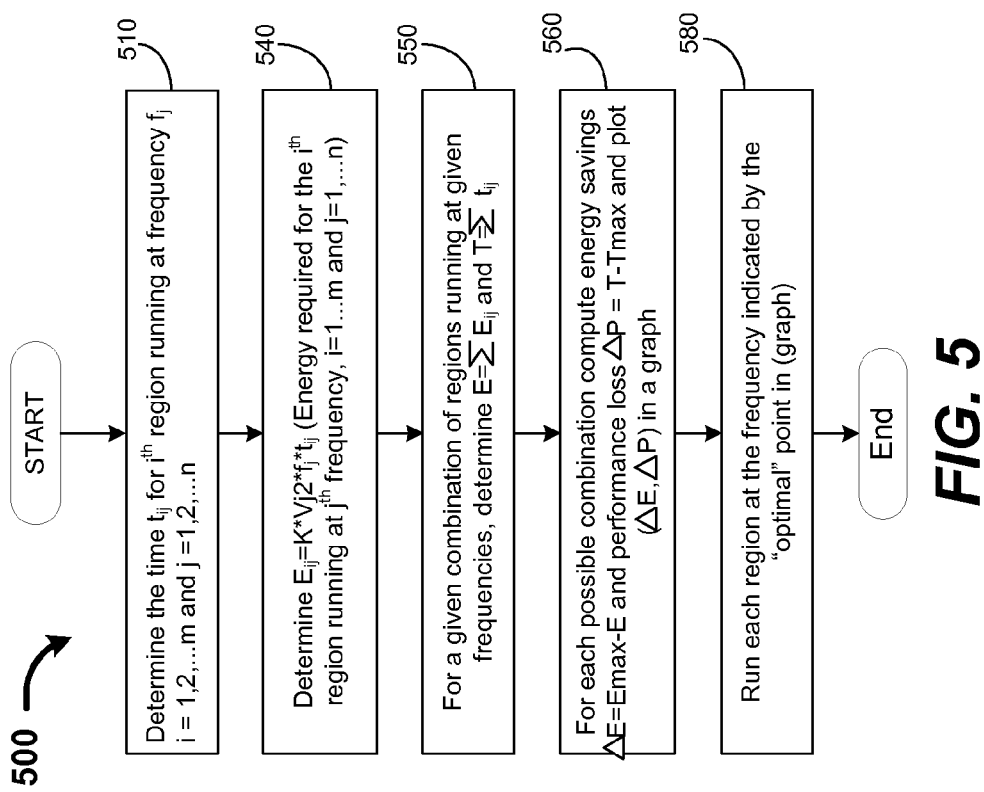
FIG. 5 illustrates a flow-chart 500, which depicts a technique to save energy for a known performance loss incurred while operating the processing element at different frequencies to perform different regions within an application based on the a posteriori technique in accordance with one embodiment.

The following description describes flexible energy optimization techniques on a computing system. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable storage medium may include any mechanism for storing or transmitting information in a form readable by a machine (e.g., a computing device).

For example, a machine-readable storage medium may include read only memory (ROM); random access memory (RAM); magnetic disk storage media; optical storage media; flash memory devices; electrical, optical forms of signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

In one embodiment, a user may be provided flexibility to choose from a range of frequencies to derive the best desired trade-off between performance loss and energy savings. In one embodiment, the user may be provided with configuration information and the user may be allowed to select a set of configuration parameters, which may allow the user to derive desired energy savings at a known performance losses. In other embodiments, the user may be provided with an interface to specify a maximum performance loss that may be tolerated (referred to as 'maximum tolerable performance loss') for an application and the techniques discussed below may choose operating points to satisfy the maximum tolerable performance loss while maximizing the energy savings.

In one embodiment, the user may select an acceptable performance loss for which the energy savings may be maximized. In one embodiment, the user may use two techniques—(1) the a posteriori technique and (2) the a priori technique to achieve the best trade-off between the energy savings and the performance loss. In one embodiment, the a posteriori technique may be used in scenarios wherein the time spent by the processing element in performing each region within the application at different frequencies may be known.

In one embodiment, using the a priori technique, the memory boundedness of the different regions of the application may be determined dynamically as the application is being performed. In one embodiment, the user may determine the frequency to operate the processing element to perform a region of an application that may provide the best energy savings for a selected performance loss.

An embodiment of an application comprising regions that have various levels of memory boundedness is illustrated in FIG. 3. In one embodiment, the application 300 may include regions 301-A to 301-M. In one embodiment, the memory boundedness of the regions 301-A to 301-M may equal (M1, M2, . . . Mm). In one embodiment, (M1, M2, . . . Mm) may represent different values of memory boundedness of the regions 301-A to 301-M. However, it may also be possible that two or more regions within the regions 301-A to 301-M may have same memory boundedness.

In one embodiment, the processing element 110 may be operated at a frequency F1 while performing the region 301-A and at a frequency F2 while performing the other region 301-K. Likewise, the processing element 110 may be operated at different frequency values (e.g., F1, F3, F5, F4, Fn) while performing different regions 301-A to 301-M based on how memory bound the regions 301-A to 301-M are.

An embodiment of a table 400 depicting the time consumed by the processing element 110 while performing the regions 301-A to 301-M at frequencies F1 to Fn is illustrated in FIG. 4. In one embodiment, the table 400 may include columns 410 and 411-A to 411-$n$ and rows 440 and 441-A to 441-M. In one embodiment, the column 410 may include labels of the regions 301-A to 301-M in rows 441-A to 441-M, respectively. In one embodiment, the row 440 may include labels of the frequencies F1 to Fn in the columns 411-A to 411-N.

Row 441-A may include (TA1, TA2, TA3 . . . TAn) in the columns 411-A to 411-$n$, respectively. In one embodiment, the processing element 110 may consume a time period of TA1 to perform the region 301-A if the processing element 110 is operated at a frequency F1 as indicated in column 411-A. In one embodiment, the region 301-A may represent MAIN_ and F1 may be equal to 1600 MHz and TA1 may be equal to 504 seconds.

In one embodiment, the processing element 110 may consume a time period of TA2 to perform the region 301-A if the processing element 110 is operated at a frequency F2 as indicated in column 411-B. In one embodiment, the processing element 110 may consume a time period of 525 seconds while performing the region 301-A (MAIN_) if the processing element 110 is operated at a frequency F2 (=1333 MHz). In one embodiment, the processing element 110 may consume a time period of TA3 (=571 seconds) while performing the same region 301-A (MAIN_) if the processing element 110 is operated at a frequency F3 (=1066 MHz).

Likewise, the time consumed by the processing element 110 while performing the same region 301-A (MAIN_) while operating at a frequency Fn (=800 MHz) may be 720 seconds. It may be noted that the performance loss incurred while operating the processing element 110 at a frequency Fn (=800 MHz) may be substantial and the energy savings may be significant. However, the user may be provided with the flexibility to choose the frequency that the processing element 110 may be operated at while being aware of the performance loss and the associated energy savings.

Likewise, Row 441-B may include (TB1, TB2, TB3 . . . TBn) in the columns 411-A to 411-$n$, respectively that may indicate the time consumed by the processing element 110 while performing the region 301-B at different frequencies F1 to Fn. In one embodiment, the processing element 110 may consume a time period of TB1 (=223 seconds, for example), TB2 (=262 seconds), TB3 (=311 seconds), and TB4 (=407 seconds) while the processing element 110 may be operated at frequencies F1(=1600 MHz), F2(=1333 MHz), F3(=1066 MHz), and Fn(=800 MHz), respectively, to perform the region 301-B. In one embodiment, the region 301-B may represent a function calc1_.

Likewise, Row 441-C may include (TC1, TC2, TC3 . . . TCn) in the columns 411-A to 411-$n$, respectively that may indicate the time consumed by the processing element 110 while performing the region 301-C at different frequencies F1 to Fn. In one embodiment, the processing element 110 may consume a time period of TC1 (=220 seconds, for example), TC2 (=254 seconds), TC3 (=260 seconds), and TC4 (=376 seconds) while the processing element 110 may be operated at frequencies F1(=1600 MHz), F2(=1333 MHz), F3(=1066

MHz), and Fn(=800 MHz), respectively, to perform the region 301-C. In one embodiment, the region 301-M may represent a function calc2_.

Likewise, Row 441-M may include (TM1, TM2, TM3 ... TMn) in the columns 411-A to 411-n, respectively that may indicate the time consumed by the processing element 110 while performing the region 301-M at different frequencies F1 to Fn. In one embodiment, the processing element 110 may consume a time period of TM1 (=205 seconds, for example), TM2 (=235 seconds), TM3 (=260 seconds), and TM4 (=319 seconds) while the processing element 110 may be operated at frequencies F1 (=1600 MHz), F2(=1333 MHz), F3(=1066 MHz), and Fn(=800 MHz), respectively, to perform the region 301-M. In one embodiment, the region 301-M may represent a function calc3_.

From the above, it may be inferred that the region 301-A (MAIN_) is comparatively more memory bound (i.e., M1 is greater than M2, M3, ... Mm) than the regions 301-B, 301-C, and 301-M, as the performance loss in the region 301-A may not be linear with respect to reduction in the frequency of the processing element 110. In one embodiment, the region 301-A, which is comparatively more memory bound, may be run at a frequency lesser than F1. However, while decreasing the frequency provided to the processing element 110 while performing the region 301-A, the performance loss associated with the decreased frequency may also be considered. In the above example, if the frequency is decreased to F2, the time (TA2) consumed by the processing element 110 to process the region 301-A may equal 523 seconds and if the frequency is decreased to F3, the time (TA3) consumed by the processing element 110 to process the region 301-A may equal 571 seconds.

By comparing TA2 and TA3, it may be inferred that the performance loss (TA3-TA2=571–525=46 seconds) may not be significant if the processing element 110 is operated at F3 instead of F2 and the energy savings may be significant. However, operating the processing element 110 at a frequency Fn (800 MHz) may substantially increase the performance loss (TA4-TA3=720–571=149 seconds) while the energy savings may not be proportionate to the performance loss. As the performance loss increases, the percentage increase in the energy savings may decrease. As a result, it may not be a best trade-off between energy savings and performance loss to operate the processing element 110 at a frequency F4 for the region 301-A. In one embodiment, the user may have the flexibility to choose the frequency after knowing the performance loss and the energy savings associated with choosing the frequency. In one embodiment, the user may choose a frequency, which may either equal F2 or F3 to operate the processing element 110 as a best trade-off between performance loss and energy savings.

In one embodiment, the a posteriori technique described below may provide flexibility to the user to select an operating point to operate the processing element 110 while processing different regions 301-A to 301-M to provide a best trade-off between the performance loss and the energy savings.

An embodiment of a posteriori technique is illustrated in flow-chart of FIG. 5. In one embodiment, the a posteriori technique may be used with the details about the application such as which regions are memory-bound and how much are these regions memory-bound. In one embodiment, the details about the memory-boundedness of the application may be used to determine the frequency at which the processing element 110 may be operated while processing different portions of the application to achieve the "best" energy savings for the "least" performance losses.

In one embodiment, in the a posteriori technique the time consumed by the processing element 110 for processing different regions of the application program 300 at different frequencies (F1 to Fn) may be determined. In one embodiment, the time consumed information may be used to determine the energy savings and the performance losses for various combinations of frequencies (F1 to Fn) for the different regions 301-A to 301-M. In one embodiment, a graph of the energy savings versus the performance loss may be plotted for each such combination. In one embodiment, the user may be allowed to choose the "best" combination of frequencies to operate the processing element 110 while processing the different regions 301-A to 301-M. Such an approach may allow the user to achieve the "best" trade-off between energy savings and performance loss.

Figure 8:
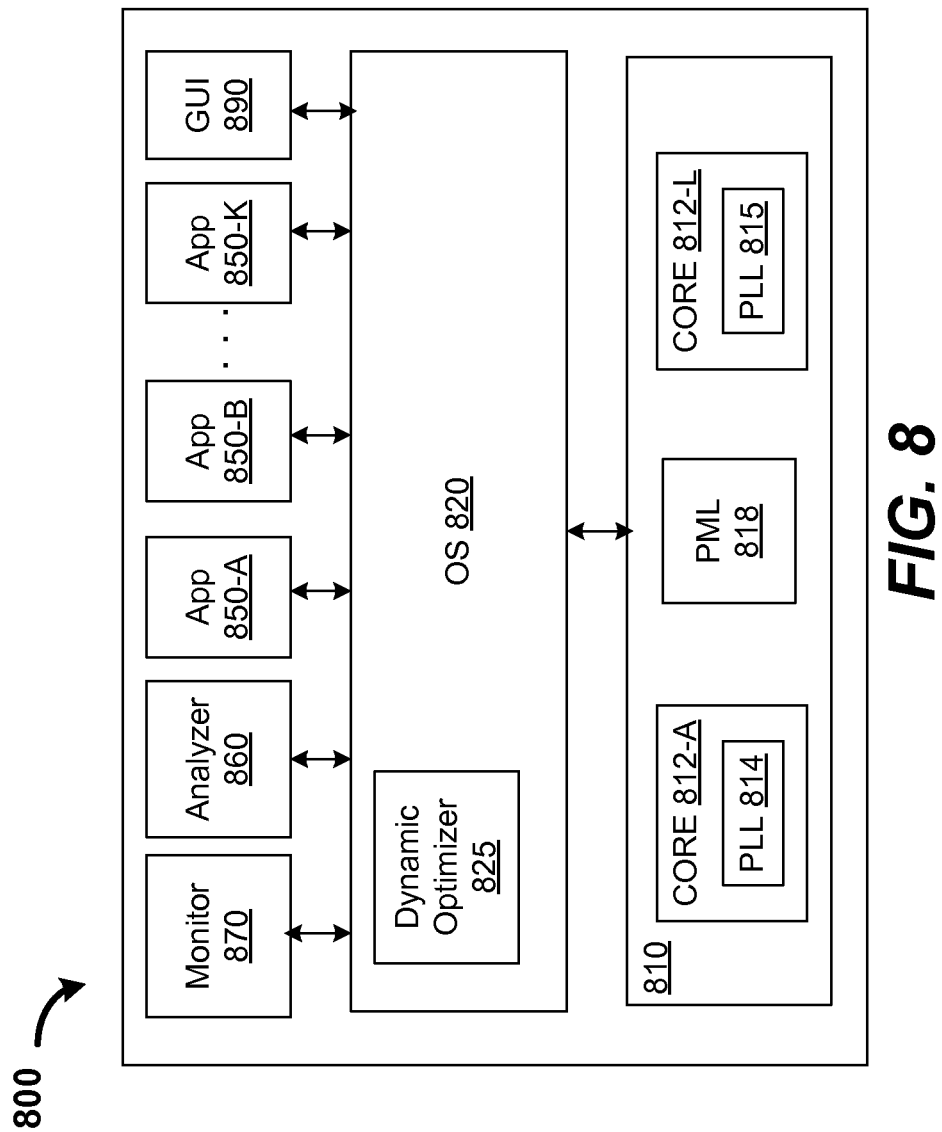
FIG. 8 illustrates a computing system 800, which may provide a user the flexibility to select the operating points for operating the computing system 800 to achieve the desired energy savings for a given performance loss in accordance with one embodiment.

Such an approach is described in further detail in the flow-chart 500. In block 510, an analyzer such as the analyzer 860 of FIG. 8 provided in a computing system such as the computing system 800 depicted in FIG. 8 may determine the time (Tij) consumed by the processing element 110 in processing the different regions 301-A to 301-M while operated at different frequencies (F1 to Fn). In one embodiment, the frequencies F1 to Fn may represent a range of frequency values that may be separated by a small incremental value to provide a fine grain control of the processing element 810. In other embodiment, the frequencies F1 to Fn may be based on the P-states defined for the processing element 810. In one embodiment, the processing element 810 may support 'j' power states and each power state may be defined by a frequency 'Fj' and voltage 'Vj'. For example, the processing element 810 may support four P-states (j=4) with operating points of $\{(F1, V1), (F2, V2), (F3, V3), \text{and} (F4, V4)\}$. In one embodiment, the analyzer may determine the time consumed 'Tij', which may represent the time consumed by the processing element 810 operating at a frequency 'Fj' while processing the 'ith' region in the application 300.

In block 540, the analyzer 860 may determine the energy consumed by the region "i" running at the "jth" frequency using the formula $Eij=k*Vj^2*fj*tij$, where Vj represents the voltage at frequency "fj" and "tij" may represent the time taken by the processing element 810 to process the ith region while operating at a frequency fj, and k is a constant.

In block 550, the analyzer 860 may determine the energy consumed by the application 300 for a given combination of regions 301-A to 301-M while the processing element 810 may be operating at given frequencies. In one embodiment, the energy (E) consumed by the application 300 may be determined by summing (E=ΣEij) the individual energy consumed for each combination of regions 301-A to 301-M and frequencies F1 to Fn. Likewise, the time consumed by the processing element 810 to process the application 300 while operating at different frequencies may be determined by summing (T=Σtij) the individual time consumed values for each combination of regions 301-A to 301-M and frequencies F1 and Fn.

In block 560, the analyzer 860 may determine the energy savings ΔE (=Emax−E) and the performance loss ΔP (=T−Tmax), wherein Emax and Tmax are the Energy and Time consumed by the processing element 810 operating at a maximum frequency while processing the application 300. In one embodiment, there may be (m*n) tuples of (ΔE, ΔP) for each combination of "m" regions 301-A to 301-M while operating at "n" (F1 to Fn) possible frequencies. In one embodiment, the tuples of (ΔE, ΔP) may be plotted in the form of a graph.

In block 580, the user may be provided with a flexibility to choose the operating point that may provide the "best" trade-off between energy savings and performance loss.

An embodiment of a table 600 depicting the energy savings and performance loss for each region operated at different frequencies is depicted in FIG. 6. In one embodiment, the table 600 may include columns 610-A to 610-R and rows 630-A to 630-Z.

Row 630-A comprises F1(=1600), F1(=1600), F1(=1600), F1(=1600), 0%, and 0% in columns 610-A, 610-B, 610-C, 610-D, 610-P, and 610-R, respectively. In one embodiment, F1(=1600), F1(=1600), F1(=1600), and F1(=1600) may indicate the frequency at which processing element 810 may be operated while processing the regions 301-A, 301-B, 301-C, and 301-D of the application 300, respectively. In one embodiment, the energy savings (as indicated in column 610-P) may be 0% and the performance loss (as indicated in column 610-R) may also be 0% as the processing element 810 operates at maximum frequency of F1 (=1600 MHz) for the regions 301-A to 301-M.

Row 630-B comprises F2(=1333), F1(=1600), F1(=1600), F2(=1333), 5.8%, and 1.9% in columns 610-A, 610-B, 610-C, 610-D, 610-P, and 610-R, respectively. In one embodiment, the processing element 810 may be operated at a frequency of 1333 MHz, 1600 MHz, 1600 MHz, and 1333 MHz while processing the regions 301-A, 301-B, 301-C, and 301-D of the application 300, respectively. However, the energy savings may not be very significant if the processing element 810 is operated at a moderate frequency (of 1333 MHz) while processing comparatively more memory bound regions such as the region 301-A. As may be observed, if the processing element 810 is operated at moderate frequencies (of 1333 MHz) while processing comparatively more memory bound regions such as the region 301-A and 301-D, there may be limited energy savings (as indicated in column 610-P) of 5.8% for a small performance loss of 1.9% (as indicated in column 610-R).

Row 630-C and 630-D indicate that the energy savings may, respectively, equal 0.85% and 0.85% for a performance loss of 2.6% and 2.9%. As may be readily observed, the energy savings value is very less (0.8%) in Rows 630-C and 630-D. Such a low value of energy savings may be attributed to operating the processing element 810 at maximum frequency (of 1600 MHz) while processing a comparatively highly memory bound region 301-A. As the highly memory bound region 301-A is operated at a maximum frequency, the energy savings may be very less.

However, if the highly memory bound regions such as the region 301-A is processed by the processing element 810 operating at a lower frequency, there may be significant energy savings. Row 630-K comprises F3(=1066), F1(=1600), F1(=1600), F3(=1066), 21.3%, and 10.1% in columns 610-A, 610-B, 610-C, 610-D, 610-P, and 610-R, respectively. In one embodiment, the processing element 810 may be operated at a frequency of 1333 MHz, 1600 MHz, 1600 MHz, and 1333 MHz while processing the regions 301-A, 301-B, 301-C, and 301-D of the application 300, respectively. In one embodiment, operating the processing element 810 at lower frequencies (e.g., 1066 MHz) while processing comparatively more memory bound regions such as the region 301-A and 301-D may result in significant energy savings of 21.3% (as indicated in column 610-P) for an acceptable performance loss of 10.1% (as indicated in column 610-R).

Likewise, energy savings and performance loss in rows 630-W and 630-Z may, respectively, equal (16.1% and 8%) and (5.8% and 10.5%). In one embodiment, as depicted in row 630-W, the frequency at which the processing element 810 may be operated while processing the regions 301-A to 301-D may equal 1066 MHz, 1600 MHz, 1600 MHz, and 1600 MHz, respectively. In one embodiment, as depicted in row 630-Z, the frequency at which the processing element 810 may be operated while processing the regions 301-A to 301-D may equal 1333 MHz, 1333 MHz, 1333 MHz, and 1333 MHz, respectively.

Figure 7:
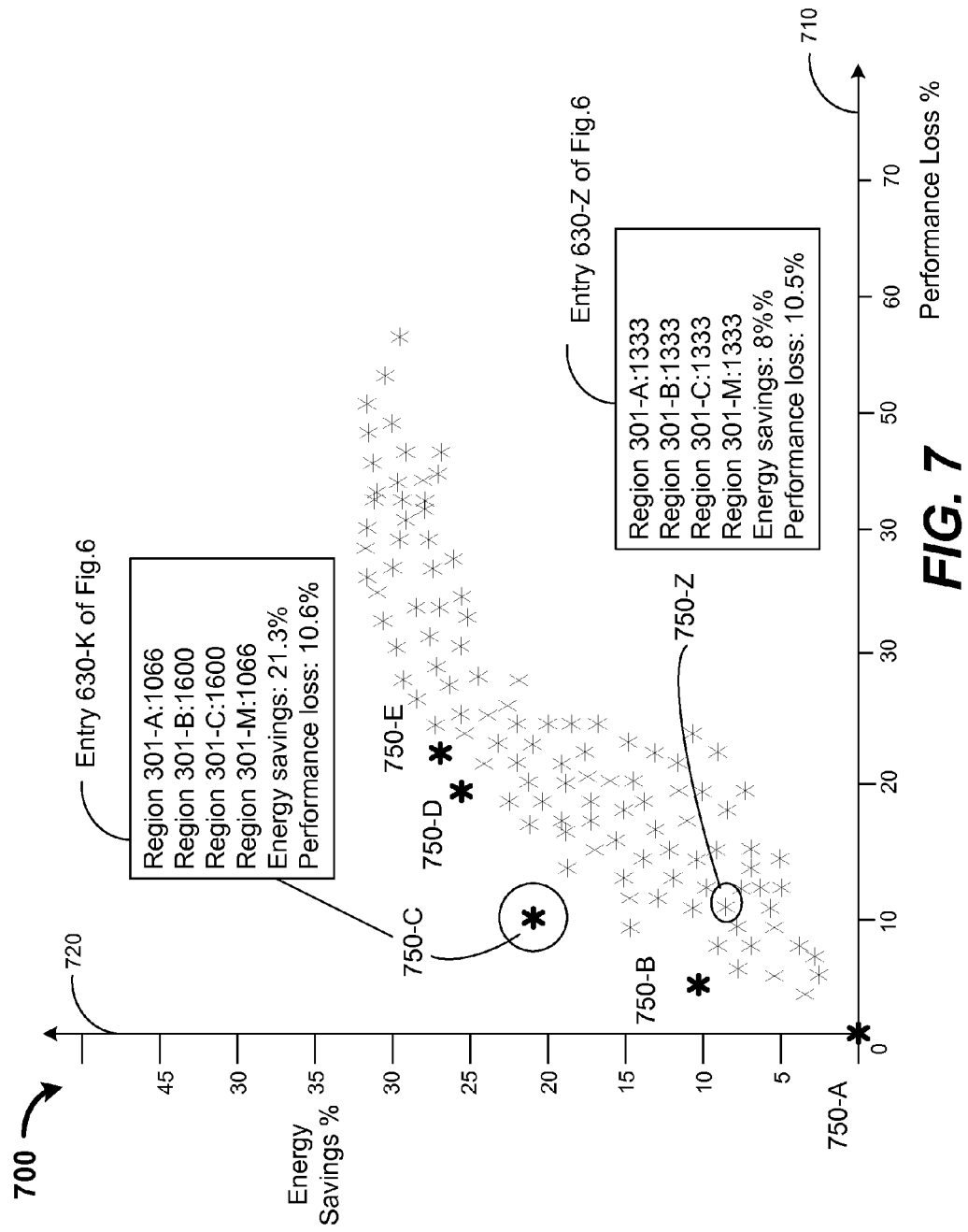
FIG. 7 illustrates a graph 700, which may be generated by plotting performance loss (in percentage) on X-axis and energy savings (in percentage) on Y-axis in accordance with one embodiment.

An embodiment of a graph 700 generated by plotting performance loss (in %) versus energy savings (in %) is depicted in FIG. 7. In one embodiment, the graph 700 may be generated by plotting performance loss on the X-axis 710 and energy savings on the Y-axis 720. In one embodiment, the tuples of (ΔE, ΔP) for each combination of "m" regions 301-A to 301-M while operating at "n" (F1 to Fn) possible frequencies may be plotted. For example, the graph 700 is plotted by choosing m=4 (i.e., regions 301-A to 301-D) and n=4 (1600 MHz, 1333 MHz, 1066 MHz, and 800 MHz, the frequencies relating to the 4 P-states).

In one embodiment, each point in the graph 700 may correspond to a row 630 in the table 600 described above. In one embodiment, the graph 700 may be plotted for all combinations of M regions running at N different frequencies and as a result, there may be 256 such points. For a given performance loss the user may be willing to tolerate, it may be easy to select the point that gives the user the best energy gains. In one embodiment, a highest point in the graph 700 may be chosen to get the best trade-off between energy savings and performance loss. In one embodiment, the point 750-C may provide the best trade-off between the energy savings and the performance loss. In one embodiment, the point 750-C may provide an energy saving of 21.3% for a performance loss of 10.1%. In one embodiment, the point 750-C may refer to an entry 630-K of FIG. 6. In one embodiment, if the user considers the other point 750-Z in the graph 700, the user may achieve an energy savings of 8% for a performance loss of 10.5% if the processing element 810 is operated at a frequency of 1333 MHz while processing the entire application 300. As a result, in one embodiment, the a posteriori technique may provide the flexibility to the user to select the operating points for the various regions (M), which may provide the best trade-off between performance loss and energy savings.

In one embodiment, the "curve" formed by the points 750-A to 750-E may rise sharply initially, and then the rate of rise may decrease significantly. In one embodiment, the "knee" of the curve may be at the point 750-C, which may provide energy savings of 21% at a performance loss of 10%. In one embodiment, the graph 700 may be displayed on the graphic user interface (GUI) 890 and the user may be provided with the flexibility to select a point on the graph 700. In one embodiment, after selecting a point on the graph 700, the parameters such as the energy savings and the performance loss may be displayed on the GUI 890 before the user may confirm the selection.

An embodiment of a computing system 800, which may provide a user the flexibility to select an operating point to provide best trade-off between the energy savings and the performance loss as illustrated in FIG. 8. In one embodiment, the computing system 800 may include the processing element 810, an operating system 820, a plurality of applications 850-A to 850-K, an analyzer 860, a monitor 870, and a graphic user interface GUI 890. In one embodiment, the analyzer 860 may analyze the memory boundedness of the various regions within each application 850. In one embodiment, the analyzer 860 may generate a table such as the table 600 comprising energy savings (in percentage) and performance loss (in percentage) for each combination of regions processed by the processing element 810 at different frequencies. In one embodiment, the analyzer 860 may generate a graph such as the graph 700 and may provide such a graph to be displayed on the GUI 890.

Figure 9:
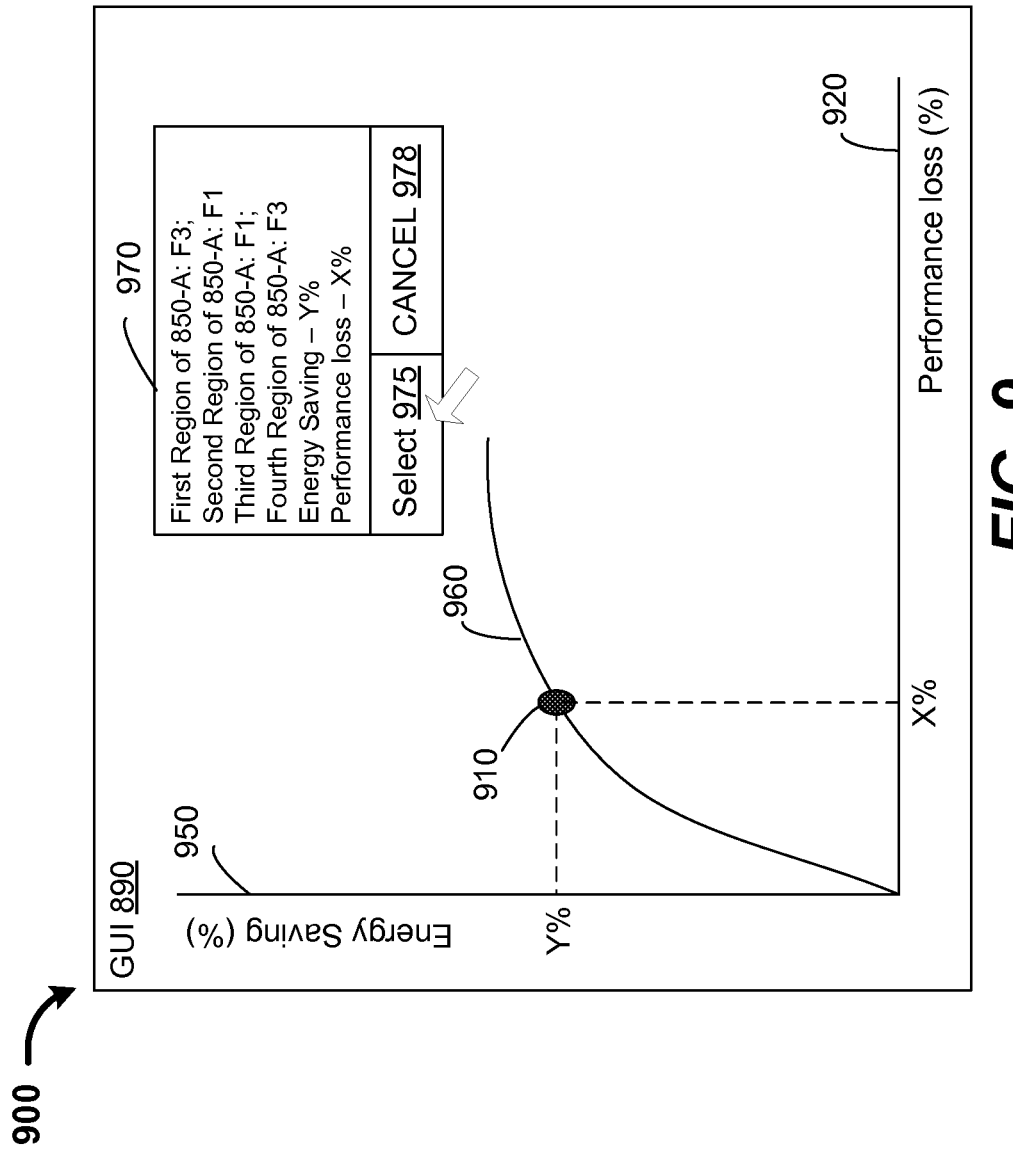
FIG. 9 illustrates a graphic user interface (GUI) supported by the computing system 700 to allow the user to select the operating points in accordance with one embodiment.

In one embodiment, the GUI 890 may display the graph of performance loss versus energy savings and the user may choose a point on the graph displayed on the GUI 890. In one embodiment, the GUI 890 may display the parameters such as the frequency values chosen for each region within the application, percentage of energy savings, and the percentage of a performance loss. In one embodiment, the GUI 890 may allow the user to confirm the selection. An embodiment of the GUI 890 allowing the user to make selections is detected in FIG. 9. In one embodiment, the user may select a point 910 on the graph 960, which may be generated by plotting the performance loss on the X-axis 920 and the energy savings on the Y-axis 950. In one embodiment, the GUI 890 may display the parameters related to the point 910 in a display portion 970 of the GUI screen. In one embodiment, the GUI 890 may allow the user to confirm the selection by selecting the button 'SELECT 975' and the user may discard the selection by selecting the button 'CANCEL 978'.

In one embodiment, the operating system OS 820 may receive the parameters or frequency values (frequencies F3, F1, F1, F3 for each region of the application 850-A) for the selected point 910. In one embodiment, the OS 820 may provide a signal comprising a list of regions and the corresponding frequency values to the processing element 810. In other embodiment, the OS 820 may select a point, which may provide the best trade-off between the energy savings and the performance loss without the user's intervention.

In one embodiment, the processing element 810 may include one or more cores such as 812-A and 812-L and a power management logic PML 818. In one embodiment, the cores 812-A and 812-L may each include a phase lock loop circuit PLL 814 and 815. In one embodiment, the power management logic PML 818 may control the clock frequency generated by the phase lock loop circuit PLL 814 in response to receiving the signal from the operating system OS 820. In one embodiment, the clock operating at a particular frequency controlled by the PML 818 may be provided to the core 812-A. In one embodiment, the power management logic PML 818 may control/change the clock frequency generated by the PLL 814 based on the operating point selected by the user.

In one embodiment, while using the a posteriori technique, in response to a user selecting an operating point 910 (which may be similar to a point 750-C depicted in FIG. 7), the PLL 814 may provide a clock at a frequency 1066 MHz to the core 812-A while the core 812-A may process a first region (similar to the region 301-A of the application 300) of the application 850-A. In one embodiment, the frequency of the clock provided by the PLL 814 may change to 1600 MHz while the core 812-A may process a second region. Similarly, the frequency of the clock provided by the PLL 814 may change to 1600 MHz while the core 812-A may process a third region, and to 1066 MHz while the core 812-A may process a fourth region. In one embodiment, the frequency of the clock provided by the PLL 814 may be decreased to a frequency (of 800 MHz, for example) corresponding to a sleep state in an idle time period between the processing of the first, second, third, and the fourth regions of the application 850-A. In one embodiment, processing different portions of the application at different frequencies based on the memory boundedness of the different portions of the application may provide fine grain control to effectively achieve energy savings while not compromising much on the performance loss.

In one embodiment, while using a priori technique, the monitor 870 may be used to generate performance monitor information based on monitoring the performance of the applications such as applications 850-A to 850-K. In one embodiment, the monitor 870 may provide the performance monitor information to a dynamic optimizer 825 supported by the OS 820. In one embodiment, the dynamic optimizer 825 may determine the memory boundedness of the different regions of the application while the application is being processed. In one embodiment, determining the memory boundedness of the different regions of the application may be performed dynamically while using the a priori technique.

In one embodiment, the a priori technique may be used if the details (such as time spent in the hotspots) of the application may be captured while the application is being processed. In one embodiment, the dynamic optimizer 825 may measure the memory-boundedness of different regions of the application (using Performance Monitor information) as the application is being processed. In one embodiment, the dynamic optimizer 825 may be provisioned in the OS 820 or in other embodiments, the dynamic optimizer 825 may be implemented as a hardware assisted block within the processing element 810. Further, the dynamic optimizer 825 may then generate a look-up table or a graph 1000 to determine the operating points (frequency) that may provide the "best" energy savings for a given performance loss that the user may tolerate. In one embodiment, the look-up table may comprise multiple enties and each entry may include three fields—(1) memory boundedness value for the region, (2) a frequency value, and (3) a performance loss that may be incurred if the processing element 810 is operated at the frequency value (specified in field (2)) while processing a region (specified in the field (1)). In one embodiment, look-up table may be displayed on the GUI 890 and the user may select an entry based on the performance loss that is acceptable to the user and the memory boundedness value of the region. The OS 820 or the dynamic optimizer 825 may then select the frequency value corresponding to the user selected entry and provide the frequency value to the power management logic 818 to control the frequency of the clock provided to the processing core 812. In one embodiment, such frequency values may be provided to the processing element 810 (or the core 812, for example) while processing different regions of the application 850-A, for example. In other embodiment, a graph of memory boundedness versus the frequency may be provided on the GUI 890 and the user may select a point on one of the performance loss curves that is acceptable to the user. The point so selected may also specify the memory boundedness value for the region. In one embodiment, the frequency value corresponding to the selected point on the performance loss curve may be determined by the OS 820 and the OS 820 may provide such frequency value to the PML 818. In one embodiment, the PML 818 may control the frequency of the clock, based on the frequency value, provided to the processing core 818 while processing that region.

Figure 10:
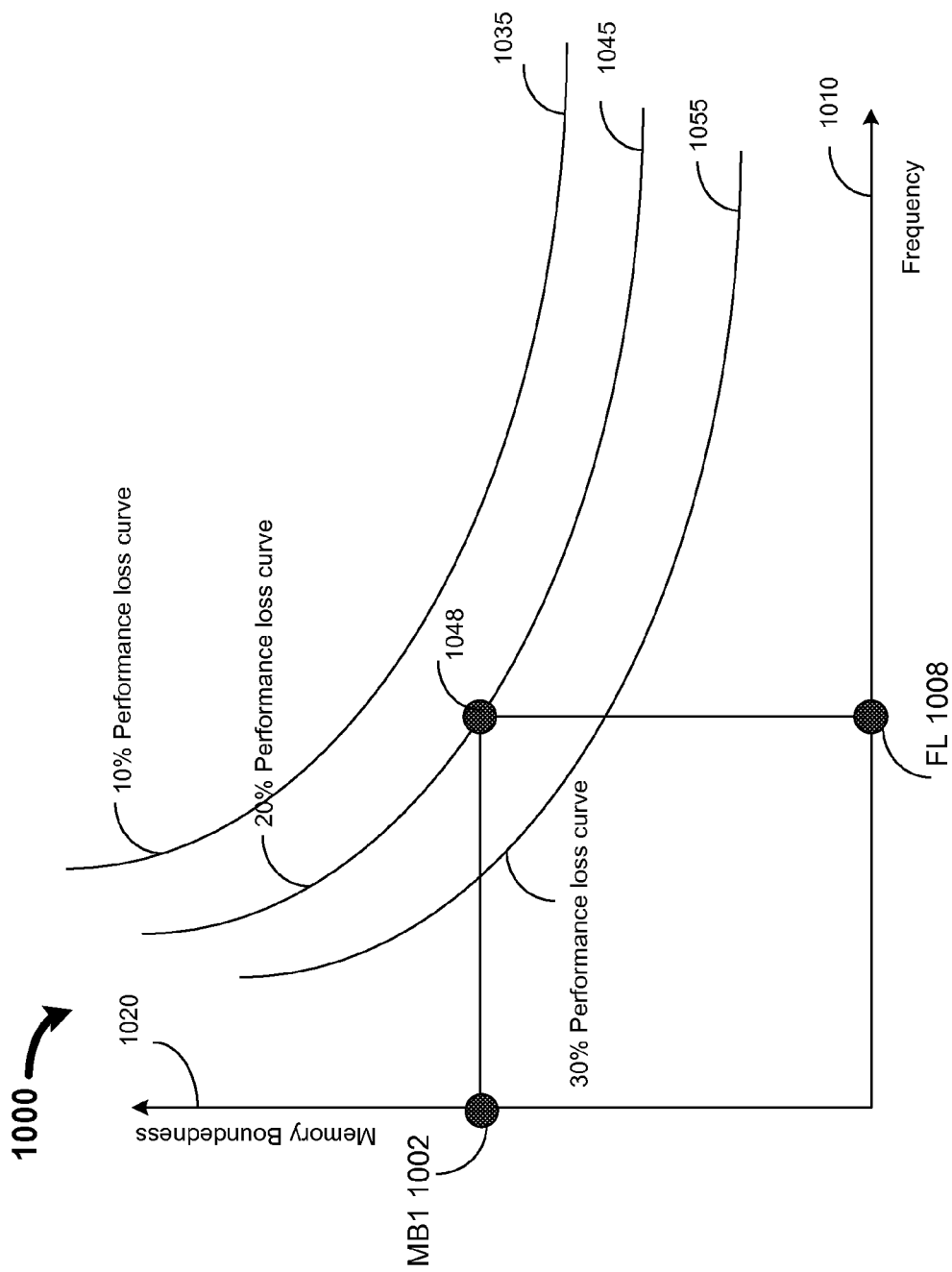
FIG. 10 illustrates a graph 1000, which may be generated by plotting frequency on X-axis and memory boundedness on Y-axis in accordance with one embodiment.

An embodiment of a graph 1000, which may be used to determine the frequency values, which may provide the "best" energy savings, is illustrated in FIG. 10. In one embodiment, the dynamic optimizer 825 may measure the memory-boundedness of a region within a selected application such as 850-A using the performance monitor information provided by the monitor 870. For example, the performance monitor information may include (number of bus transactions/number of processing clocks), which may be used by the dynamic optimizer 825 to determine the memory-boundedness of each region.

In one embodiment, if the user is willing to tolerate 20% performance loss, the a priori technique may determine a point 1048 on a 20% performance loss curve 1045 and may then determine the frequency FL (which is a point on the X-axis corresponding to the point 1048 on the curve 1045) for the best energy gains for the region. In the above example, the processing element 810 may support finite number of P-states (thus finite number of frequencies) and the power management logic PML 818 may determine a P-state frequency that may be closest to the frequency determined by the point FL.

In one embodiment, the graph 1000 may be dependent on the specification of the processing element 810 and the memory subsystem and may be independent of any workload. In one embodiment, for an allowed performance loss, the processing element 810 may be operated at a lower frequency if the region that may be processed is comparatively more memory bound. In one embodiment, for the same allowed performance loss, the processing element 810 may be operated at a higher frequency if the region that may be processed is comparatively less memory bound. As a result, the frequency at which the processing element 810 may be operated may decrease as memory-boundedness increases and the frequency at which the processing element 810 may be operated may increase as memory-boundedness decreases.

Also, for a region, which may possess a certain memory-boundedness value, the performance loss may decrease as the processing element 810 may be operated at a higher frequency. As a result, the 10% performance loss curve 1035 may be farther away from the origin and above the 20% performance loss curve 1045. In one embodiment, the 30% performance loss curve 1055 may be closer to the origin and below the 20% performance loss curve 1045.

In support of the above, in one embodiment, it may be shown mathematically that the curves 1035, 1045, and 1055 may be of the shapes and positioned in an order as depicted in the graph 1000 of FIG. 10. It may be assumed that a given region of the application 850-A may use (x+y) cycles (core clocks) at a frequency Fmax (=1600 MHz, for example), wherein 'x' may represent a number of cycles in which last level cache (LLC) hits may occur and 'y' may represent a number of cycles in which LLC misses occur and T may represent a reduced frequency specified by the a priori technique. Then, the time consumed by the processing element 810 to process the first region of the application 850-A while operating Fmax may be given by Equation (1) below:

$$TF\text{max}=(x+y)/(F\text{max})\text{sec} \quad \text{Equation (1)}$$

In one embodiment, the time consumed by the processing element 810 operating at a reduced frequency 'f' while processing the first region of the application 850-A may be given by Equation (2) below:

$$Tf=[(x/f)+(y/F\text{max})]\text{sec} \quad \text{Equation (2)}$$

In one embodiment, the value y/Fmax may not change as the time consumed in waiting for cache misses may not change even if the frequency provided to the processing element 810 may change.

In one embodiment, the performance loss incurred while the processing element 810 operates at the reduced frequency 'f' while processing the first region may be given by the Equation (3) below:

$$\Delta p=1[(1/Tf)/(1/TF\text{max})]=1-[((x+y)/F\text{max})/(x/f)+(y/F\text{max})]=(xF\text{max}-xf)/(xF\text{max}+yf)=(F\text{max}-f)/(F\text{max}+(y/x)f) \quad \text{Equation (3)}$$

In one embodiment, let MB denote a metric for memory-boundedness for the first region. In one embodiment, MB may be defined by a metric (Bus Clocks/Total Cycles) and MB may be equal to (y/(x+y)).

$$\text{Therefore, } MB=1x/(x+y) \text{ or } x/(x+y)=1-MB \text{ or } (1+y/x)\\=1/(1-MB) \text{ or } y/x=1/(1-MB)-1, \text{ or } y/x=MB/(1-MB) \quad \text{Equation (4)}$$

In one embodiment, the term (y/x) in Equation (3) may be substituted by using the expression for (y/x) in Equation (4). On substitution, the Equation (3) may be re-written as depicted in Equation (5) below:

$$\Delta p=(F\text{max}-f)/(F\text{max}+(MB/(1-MB))f) \quad \text{Equation (5)}$$

For a given $\Delta p$, $\Delta p.F\text{max}+\Delta p.(MB/(1-MB)).f=F\text{max}-f$ $$f(1+\Delta p.(MB/(1-MB))=F\text{max }(1-\Delta p).f=F\text{max }(1-\Delta p)/(1+\Delta p(MB/(1-MB))) \quad \text{Equation (6)}$$

From Equation (6), it may be observed that, for a given $\Delta p$ that the user may be willing to accept, f decreases as MB increases i.e., the more a region is memory-bound, the processing element 810 may be operated at a lower frequency while processing the first region and for the same performance loss. Similarly for a given frequency, the performance loss may decrease as MB increases. Thus, if the above Equation (6) is plotted, graphs similar to the graphs 1035, 1045, and 1055 of a priori technique depicted in FIG. 10 may be arrived at.

In one embodiment, using the above Equation (6) for "f" in terms of MB and $\Delta p$, the graph for this technique may be empirically derived by using the experimental results from the a posteriori approach and use curve-fitting techniques to fit the experimental results into Equation (6). For example, it may be observed that from a 20% performance loss curve 1045 for an MB of the first region (MB1), a frequency value "f" may be determined by identifying a point (such as FL 1008) on the X-axis 1010. In one embodiment, such tuples ($\Delta p$, MB, f) from one or more applications 850-A to 850-K may be plotted and the curves such as the curves 1035, 1045, and 1055 that satisfy Equation (6) and best fit the values of ($\Delta p$, MB, f) may be generated.

Figure 11:
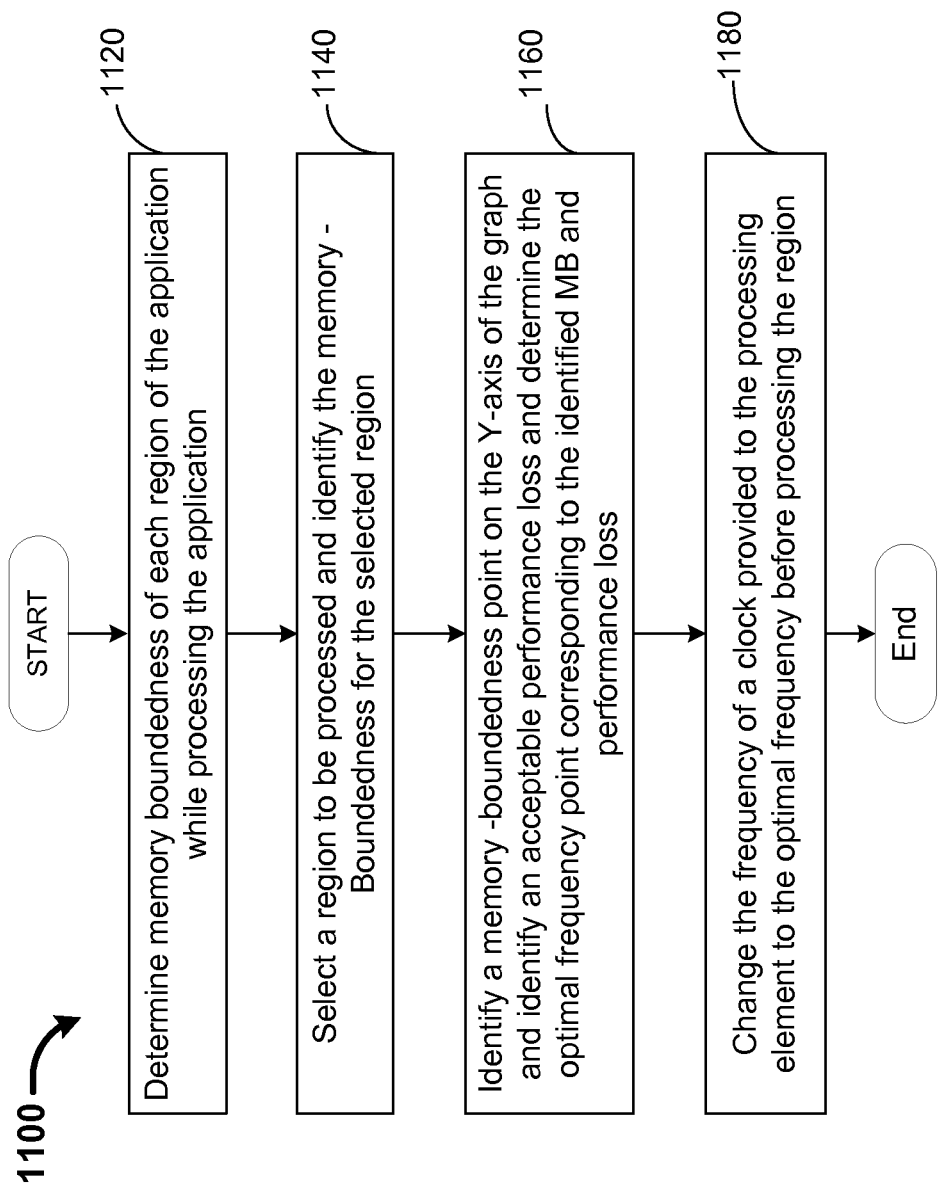
FIG. 11 is a flowchart that illustrates an operation of the computing system 800, which may provide a user the flexibility to select the operating points for operating the computing system 800 to achieve the best energy savings for a desired performance loss using the a priori technique in accordance with one embodiment.

An embodiment of a priori technique is illustrated in FIG. 11. In block 1120, the dynamic optimizer 825 may determine memory boundedness of each region of the application such as the first, second, third, and fourth regions of the application 850-A while processing the application. In one embodiment, the dynamic optimizer 825 may determine the memory boundedness of the first region as MB1.

In block 1140, the OS 820 may select a region such as the first region of the application 850-A to be processed and the memory boundedness for the selected first region may be identified as MB1.

In block 1160, the dynamic optimizer 820 may identify a point (MB1 1002) on the Y-axis 1020 corresponding to a memory boundedness MB1 of the first region and may identify a curve such as 1035, 1045, or 1055 based on the acceptable performance loss indicated by the user. In one embodiment, the dynamic optimizer 820 may identify a point 1048 (corresponding to the point MB1 1002) on a 20% performance loss curve 1045 based on an acceptable performance loss indicated by the user. In one embodiment, the dynamic optimizer 820 may identify a point (FL 1008) on the X-axis 1020 that may represent an optimal frequency value corresponding to the point 1048 on the 20% performance loss curve 1045.

In block 1180, the power management logic 818 may control the PLL 814 to change the frequency of the clock to FL 1008, which may be provided to the core 812-A while the core may be ready to process the first region of the application 850-A. In one embodiment, the power management logic 818 may control the PLL 814 to cause a change in the frequency of the clock based on the input provided by the dynamic optimizer 825.

Although the above description refers to choosing the frequency value corresponding to the memory boundedness of each of the regions in the application, the voltage values may also be chosen based on the memory boundedness of each of the regions to provide a fine grain control over the computing system 800. Other embodiments may include changing the power consumed by the processing element based on the memory boundedness of each of the regions in the application. Such other variations are contemplated to be within the scope of the embodiments described above.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A method in a computing platform comprising:
   determining a plurality of time values consumed by a processing element to perform each of a plurality of regions within an application at a plurality of frequency values;
   determining performance loss values for each of the plurality of regions based on the plurality of time values:
   determining energy savings values for each of the plurality of regions based on voltage values for each of the plurality of frequency values:
   generating a graph by plotting the energy savings values and the performance loss values;
   receiving a user input, via a graphics user interface, selecting a point of operation indicating a first performance loss value and a first energy savings value, wherein the first performance value is included in the performance loss values and the first energy savings value is included in the energy savings value;
   determining first frequency values corresponding to the first performance loss value and the first energy savings value, at which a processing element is to be operated while processing each of the plurality of regions; and
   changing frequency of a clock provided to the processing element based on the first frequency values, wherein the frequency of the clock provided to the processing element is changed while the processing element is performing the plurality of regions;
   wherein operating the processing element at the first frequency values while processing the plurality of regions is to provide optimal energy savings.

2. The method of claim 1 comprises determining the plurality of time values consumed by the processing element while performing the plurality of regions within an application at a plurality of frequency values is known.

3. The method of claim 1 comprises changing the frequency of the clock provided by a phase lock loop circuit to the first frequency values before the processing element starts processing the each of the plurality of regions.

4. The method of claim 3, wherein the frequency value is same for each of the plurality of regions.

5. The method of claim 4, wherein the frequency value is different for each of the plurality of regions.

6. A method in a computing platform comprising:
   determining a memory boundedness value for each of a plurality of regions within an application;
   generating a graph by plotting the energy savings values and the performance loss values;
   receiving a user input, via a graphics user interface using the graph, to select a point of operation indicating a maximum tolerable performance loss value for the plurality of regions;
   determining a frequency value at which a processing element is to operate while performing each of the plurality of regions, wherein the frequency value is determined based on the memory boundedness value for each of the plurality of regions and the maximum tolerable performance loss; and
   changing frequency of a clock provided to the processing element based on the frequency value, wherein the frequency of the clock provided to the processing element is changed while the processing element is performing the plurality of regions;
   wherein operating the processing element at the frequency value while processing the plurality of regions is to provide optimal energy savings.

7. The method of claim 6 comprises determining dynamically the memory boundedness value of each of the plurality of regions while processing the application.

8. The method of claim 6 comprises determining the frequency value for each of the plurality of regions using a look-up table, wherein the maximum tolerable performance loss value and the memory boundedness value is used to identify an entry in the look-up table that includes the frequency value.

9. The method of claim 8 comprises creating the look-up table by collecting memory boundedness values and performance loss values by processing a plurality of applications at a plurality of frequencies.

10. The method of claim 9 comprises using a dynamic optimizer to create the look-up table.

11. The method of claim 8 comprises changing the frequency of the clock provided by a phase lock loop circuit to the frequency value before the processing element starts processing each of the plurality of regions.

12. The method of claim 11, wherein the frequency value is same for each of the plurality of regions.

13. The method of claim 11, wherein the frequency value is different for each of the plurality of regions.

14. A machine-readable storage medium comprising a plurality of instructions that in response to being executed result in a processor comprising:
   determining a memory boundedness value for each of a plurality of regions within an application;
   generating a graph by plotting the energy savings values and the performance loss values;
   receiving a user input, via a graphics user interface using the graph, to select a point of operation indicating a maximum tolerable performance loss value for the plurality of regions;
   determining a frequency value at which a processing element is to operate while performing each of the plurality of regions, wherein the frequency value is determined based on the memory boundedness value for each of the plurality of regions and the maximum tolerable performance loss; and
   changing frequency of a clock provided to the processing element based on the frequency value, wherein the frequency of the clock provided to the processing element is changed while the processing element is performing the plurality of regions;
   wherein operating the processing element at the frequency value while processing the plurality of regions is to provide optimal energy savings.

15. The machine-readable storage medium of claim 14 comprises determining dynamically the memory boundedness value of each of the plurality of regions while processing the application.

16. The machine-readable storage medium of claim 14 comprises determining the frequency value for each of the plurality of regions using a look-up table, wherein the maximum tolerable performance loss value and the memory boundedness value is used to identify an entry in the look-up table that includes the frequency value.

17. The machine-readable storage medium of claim 16 comprises creating the look-up table by collecting memory boundedness values and performance loss values by processing a plurality of applications at a plurality of frequencies.

18. The machine-readable storage medium of claim 17 comprises using a dynamic optimizer to create the look-up table.

19. The machine-readable storage medium of claim 17 comprises changing the frequency of the clock provided by a phase lock loop circuit to the frequency value before the processing element starts processing each of the plurality of regions.

20. The machine-readable storage medium of claim 19, wherein the frequency value is same for each of the plurality of regions.

21. The machine-readable storage medium of claim 19, wherein the frequency value is different for each of the plurality of regions.

22. A computing system comprising:
a plurality of applications;
a monitor;
an analyzer;
a graphics user interface;
an operating system including a dynamic optimizer;
a processing element; and
a power management logic coupled to the processing element and the operating system;
wherein the analyzer is to, determine a plurality of time values consumed by a processing element to perform each of a plurality of regions within an application at a plurality of frequency values, determine performance loss values for each of the plurality of regions based on the plurality of time values, determine energy savings values for each of the plurality of regions based on voltage values for each of the plurality of frequency values;
and generate a graph by plotting the energy savings values and the performance loss values;
wherein the graphics user interface is to receive a user input via the graph selecting a point of operation indicating a first performance loss value and a first energy savings value, wherein the first performance value is included in the performance loss values and the first energy savings value is included in the energy savings value;
wherein the operating system is to determine first frequency values corresponding to the first performance loss value and the first energy savings value, at which a processing element is to be operated while processing each of the plurality of regions; and
wherein the power management logic is to cause a change in frequency of a clock provided to the processing element based on the first frequency values, wherein the frequency of the clock provided to the processing element is changed while the processing element is performing the plurality of regions;
wherein operating the processing element at the first frequency values while processing the plurality of regions is to provide optimal energy savings.

23. The computing system of claim 22, wherein the analyzer is to determine the plurality of time values consumed by the processing element while performing the plurality of regions within an application at a plurality of frequency values prior to receiving the user input.

24. The computing system of claim 22, wherein the power management logic is to cause a change in the frequency of the clock provided by a phase lock loop circuit to the first frequency values before the processing element starts processing each of the plurality of regions.

25. The computing system of claim 24, wherein the frequency value is same for each of the plurality of regions.

26. The computing system of claim 24, wherein the frequency value is different for each of the plurality of regions.

* * * * *